US010044068B2

(12) United States Patent
Moreau et al.

(10) Patent No.: US 10,044,068 B2
(45) Date of Patent: Aug. 7, 2018

(54) COPOLYMER FOR BIPOLAR BATTERY

(71) Applicant: Commissariat A L'Energie Atomique Et Aux Energies Alternatives, Paris (FR)

(72) Inventors: Gilles Moreau, Grenoble (FR); Lionel Pricard, Seyssinet-Pariset (FR)

(73) Assignee: COMMISSARIAT A L'ENERGIE ATOMIQUE ET AUX ENERGIES, Paris (FR)

( * ) Notice: Subject to any disclaimer, the term of this patent is extended or adjusted under 35 U.S.C. 154(b) by 105 days.

(21) Appl. No.: 15/037,810

(22) PCT Filed: Nov. 17, 2014

(86) PCT No.: PCT/IB2014/066100
§ 371 (c)(1),
(2) Date: May 19, 2016

(87) PCT Pub. No.: WO2015/075620
PCT Pub. Date: May 28, 2015

(65) Prior Publication Data
US 2016/0293998 A1 Oct. 6, 2016

(30) Foreign Application Priority Data

Nov. 20, 2013 (FR) .................................. 13 61395

(51) Int. Cl.
H01M 10/058 (2010.01)
H01M 10/0525 (2010.01)
H01M 10/0565 (2010.01)
H01M 10/42 (2006.01)
H01M 2/14 (2006.01)

(52) U.S. Cl.
CPC ......... *H01M 10/058* (2013.01); *H01M 2/145* (2013.01); *H01M 10/0525* (2013.01); *H01M 10/0565* (2013.01); *H01M 10/4235* (2013.01)

(58) Field of Classification Search
CPC ............ H01M 2/145; H01M 10/0525; H01M 10/0565; H01M 10/058; H01M 10/4235; H01M 2300/0025; H01M 2300/0065; H01M 2300/0082
See application file for complete search history.

(56) References Cited

U.S. PATENT DOCUMENTS

| | | | |
|---|---|---|---|
| 7,097,937 B2 | 8/2006 | Fredriksson et al. | |
| 7,163,765 B2 | 1/2007 | Hosaka | |
| 7,220,516 B2 | 5/2007 | Oosawa et al. | |
| 7,279,248 B2 | 10/2007 | Fukuzawa et al. | |
| 7,320,846 B2 | 1/2008 | Watanabe et al. | |
| 7,326,493 B2 | 2/2008 | Martinet | |
| 7,335,448 B2 | 2/2008 | Kaito et al. | |
| 7,338,733 B2 | 3/2008 | Morita et al. | |
| 7,348,098 B2 | 3/2008 | Hayashi et al. | |
| 2005/0285080 A1* | 12/2005 | Suzuki .................. H01G 9/042 252/182.1 |
| 2006/0121348 A1 | 6/2006 | Mizutani et al. | |
| 2007/0015047 A1 | 1/2007 | Hoswaka et al. | |
| 2008/0057392 A1 | 3/2008 | Takamatsu | |
| 2008/0060189 A1 | 3/2008 | Daidoji et al. | |
| 2009/0282672 A1 | 11/2009 | Puester et al. | |
| 2011/0183202 A1* | 7/2011 | Lee ........................ H01M 4/133 429/212 |
| 2014/0113176 A1* | 4/2014 | Muramatsu ......... H01M 2/1646 429/145 |
| 2016/0301100 A1* | 10/2016 | Picard ................. H01M 10/052 |

FOREIGN PATENT DOCUMENTS

| | | |
|---|---|---|
| JP | 2007048541 A | 2/2007 |
| JP | 2008130450 A | 6/2008 |
| JP | 2008166256 A | 7/2008 |
| JP | 2010244943 A | 10/2010 |
| TW | 201044674 A | 12/2010 |
| WO | 03047021 A2 | 6/2003 |
| WO | 2006061696 A2 | 6/2006 |
| WO | 2007142731 A2 | 12/2007 |
| WO | 2009131961 A2 | 10/2009 |
| WO | 2010101794 A1 | 9/2010 |
| WO | WO 2012/176669 | * 12/2012 |

OTHER PUBLICATIONS

He, Y., Lodge, T.—A thermoreversible ion gel by triblock copolymer self-assembly in an ionic liquid, Chem. Commun., 2007, pp. 2732-2734 (Year: 2007).*
He, Y., Lodge, T.—Thermoreversible Ion Gels with Tunable Melting Temperatures from Triblock and Pentablock Copolymers, Macromolecules, 2008, 41, pp. 167-174 (Year: 2008).*
International Search Report for PCT/IB2014/066100 dated Feb. 6, 2015.
Byeongmoon Jeong et al. "Thermosensitive sol-gel reversible hydrogeis." Advanced Drug Delivery Reviews, Elsevier Amsterdam, NL, vol. 54, No. 1, Jan. 17, 2002, pp. 37-51.

* cited by examiner

*Primary Examiner* — Anca Eoff
(74) *Attorney, Agent, or Firm* — Cooper Legal Group LLC; Ronald Kachmarik

(57) ABSTRACT

The invention relates to the use of a liquid/solid reversible phase change electrolyte to prepare a bipolar lithium-ion battery. Said use is characterized in that said electrolyte contains at least one block copolymer containing at least one polymer segment A, soluble in said electrolyte, and at least one polymer segment B, having a temperature T for solubilization in said electrolyte. The polymer segments A and B are present in sufficient amounts to allow physical gelling of the electrolyte at a temperature greater than or equal to the temperature T.

14 Claims, 6 Drawing Sheets a)

b)

c)

a)

b)

a)

b)

COPOLYMER FOR BIPOLAR BATTERY

CROSS REFERENCE TO RELATED APPLICATION

This application is a 371 of PCT/IB2014/066100 filed Nov. 17, 2014.

TECHNICAL FIELD

The present invention relates to the field of lithium electrochemical generators which operate according to the principle of insertion or of deinsertion, or in other words intercalation-deintercalation, of lithium in at least one electrode.

It relates in particular to the field of lithium electrochemical accumulators comprising at least one current collector having a bipolar function, also known as bipolar batteries.

More specifically, the invention is targeted at improving the leaktightness of a bipolar battery with regard to its liquid electrolyte.

STATE OF THE ART

The architecture of conventional lithium-ion batteries is an architecture which may be described as monopolar as it comprises a single electrochemical cell comprising an anode, a cathode and an electrolyte.

The architecture of batteries of this type has been mainly developed with regard to a monopolar architecture incorporated by winding or by stacking.

In a monopolar architecture by winding, also known as "roll-to-roll", the winding is composed of a current collector on which a positive electrode material (cathode) is continuously deposited, a separator made of ceramic or polymer material which will be inserted and a negative electrode material (anode) itself deposited on another current collector.

Mention may be made, as examples of batteries having a geometry of monopolar architecture by winding, of those disclosed in Patent Application US 2006/0121348 and U.S. Pat. No. 7,348,098 and U.S. Pat. No. 7,338,733.

As regards the architecture of conventional lithium-ion batteries by stacking, it corresponds to a stack of positive electrodes, of separators and of negative electrodes assembled in order to make it possible to have a large active material surface.

Mention may be made, as examples of batteries having a stack geometry, of those disclosed in Patent Applications US 2008/0060189 and US 2008/0057392 and U.S. Pat. No. 7,335,448.

The monopolar architectures by winding or by stacking exhibit the significant advantage of having a large active material surface. However, the difference in potential is restricted therein to the unitary value of the difference in potential between the two electrode materials used.

Two types of packagings, rigid or flexible, are generally considered for monopolar batteries. A rigid packaging makes it possible to withstand mechanical stresses and also excess pressures/negative pressures, occasioned in particular during the filling of it with electrolyte, but it is heavy and bulky. For its part, a flexible packaging, which is less dense than the rigid packaging, makes it possible to obtain greater energy densities. However, it is less resistant to external attacks.

Usually, the filling of these monopolar batteries by a liquid electrolyte is carried out at ambient temperature by drawing under vacuum from the inside of the element and then by filling at ambient temperature and pressure. It should be noted that a flexible packaging is more restrictive during filling. This is because it is more complex to fill with electrolyte as it is more subject to the variations in pressure and more complex to render leaktight.

In order to increase the mean potential of a monopolar Li-ion accumulator while retaining a comparable energy density, batteries having a plurality of electrochemical cells in series were developed. The architecture of the battery is thus described as bipolar as it comprises a cathode of one cell and an anode of an adjacent cell which are supported on one and the same current collector in the form of a plate, which collector is itself described as bipolar electrode. A bipolar battery thus places in series several monopolar accumulators via the bipolar electrodes or current collectors. Mention may be made here of numerous patent applications or patents relating to such bipolar batteries, such as U.S. Pat. No. 7,279,248, U.S. Pat. No. 7,220,516, U.S. Pat. No. 7,320,846, U.S. Pat. No. 7,163,765, WO 03/047021, WO 2006/061696, U.S. Pat. No. 7,097,937 or US2007/0015047.

The main advantages of bipolar batteries are those of having a reduced electrical resistance, in comparison with monopolar accumulators connected in series by external connectors, of having a reduced weight and of not comprising unnecessary volumes, that is to say that the packaging containing the battery comprises substantially no empty spaces. In addition, a bipolar battery is of flexible format as its own electrodes are used for the intercompartment leaktightness.

The main technical problem encountered during the manufacture of bipolar batteries is that of producing compartments, corresponding to the electrochemical cells and also known as "unitary elements", which are leaktight with regard to one another from the viewpoint of the liquid electrolyte which they contain. For obvious reasons, it is necessary to avoid leaks. Poor leaktightness between the different compartments will necessarily result in a disfunctioning of the bipolar battery by ionic short circuits. Conventional filling methods are thus confronted with the need to produce compartments which are perfectly leaktight to the liquid electrolyte and which do not comprise trapped gases.

Several solutions have already been envisaged for improving the filling of bipolar batteries with electrolyte.

Usually, the method for filling a battery requires placing under vacuum the packaging containing the anode/separator/cathode assembly and the introduction of the liquid electrolyte, under or not under pressure. These operations are generally followed by an impregnation time in order to allow the electrolyte to fill all the empty regions, or pores, of the anode/separator/cathode assembly.

The leaktightness operation is conventionally carried out consecutively in order to ensure the integrity of the system. It is generally carried out by soldering or application of a part added to the packaging containing the anode/separator/cathode/electrolyte assembly. This unfortunately results in a material nonhomogeneity between the parts added and the packaging prejudicial to the leaktightness. Furthermore, such a method is complex to carry out in the case of a bipolar element. This is because, as the current collectors act as packaging, the performance of the battery may be damaged during the stages of filling and leaktightness.

The other solutions provided in the documents JP 2008166256, US 2009/0282672 and TW 201044674 also exhibit the disadvantage of resulting in a nonhomogeneous, that is to say damaged, leaktightness.

Admittedly, other solutions, in particular those disclosed in the documents JP 2008130450 and U.S. Pat. No. 7,163,765, make it possible to overcome the problem of nonhomogeneous leaktightness. However, these solutions, on the other hand, remain too complex in terms of implementation.

Consequently, a need remains to have available an effective solution for guaranteeing a leaktightness which is homogeneous, lasting and easy to carry out, in the context of the filling of the electrolyte in bipolar batteries in particular.

An objective of the present invention is specifically to meet this need.

In particular, the invention has the objective of providing an improved solution for carrying out, in an Li-ion bipolar battery and more generally in a lithium electrochemical generator, the filling of the electrolyte while making it possible to guarantee the leaktightness of the compartments between one another with regard to the liquid electrolyte.

Account of the Invention

The main subject-matter of the present invention is thus the use of an electrolyte having a reversible liquid/solid phase change in the preparation of a bipolar lithium-ion battery or accumulator in which the said electrolyte contains at least one block copolymer comprising at least one polymeric segment A which is soluble in the said electrolyte and at least one polymeric segment B having a temperature for dissolution "T" in the said electrolyte, the polymeric segments A and B being present in amounts sufficient to make possible the physical gelling of the electrolyte at a temperature greater than or equal to the temperature "T".

The said block copolymer is "heat-sensitive". Thus, the copolymer under consideration according to the present invention advantageously provides an increase in the viscosity, indeed even the gelling, of the electrolyte for a lithium-ion battery, when it is brought to a temperature at least equal to the temperature "T", and then the return of the electrolyte to a liquid state when the temperature of the battery falls back below "T". It is on this account that the electrolyte is known as "having a reversible liquid/solid phase change".

This ability of the copolymer according to the invention is essentially related to the presence of at least one polymeric segment (B) which is insoluble in the electrolyte at a temperature of less than "T" but which becomes soluble at the temperature "T".

Without wishing to be committed to any one theory, it appears that the dissolution of this polymeric segment in the electrolyte, obtained at a temperature greater than "T", results in an expansion of the chains constituting this polymeric segment, thus making possible bridgings by physical interactions within the chains of the polymeric segments B, indeed even between the chains of the polymeric segments B and of the polymeric segments A, and thus making it possible to form a three-dimensional network, by physical crosslinking, creating strong bonds, for example hydrogen bonds. On the other hand, at a temperature of less than "T", these polymeric segments B are insoluble in the electrolyte and consequently their chains are folded back over themselves, wound into balls.

Admittedly, use of block copolymers has already been considered in lithium batteries but, to the knowledge of the inventors, essentially for improving the ionic conductivity of these batteries. These applications are described in particular in the documents WO 2010/101794, WO 2009/131961 and WO 2007/142731. Furthermore, the copolymers which are described therein are different from those considered according to the invention.

The present invention is also targeted at a process for preparing a lithium battery or accumulator comprising at least one electrochemical cell (C), composed of at least one anode and one cathode on either side of a separator impregnated with an electrolyte, and one compartment constructed in order to contain the electrochemical cell(s) with leaktightness while being traversed by a portion of the current collectors forming the poles; in this process:

the said electrolyte is one having a reversible liquid/solid phase change and contains at least one block copolymer comprising at least one polymeric segment A which is dissolved in the said electrolyte and at least one polymeric segment B having a transition temperature for dissolution "T" in the said electrolyte, the polymeric segments A and B being present in amounts sufficient to make possible the physical gelling of the electrolyte at a temperature greater than or equal to the temperature "T", and the said process comprises at least the stages consisting in:

handling the said electrolyte during the production of the said cell at a temperature greater than or equal to the temperature "T" and lowering the temperature of the said electrolyte, after the leaktightness of the said cell containing the said gelled electrolyte has been obtained, to a temperature less than the temperature T.

The process according to the invention is advantageous in several respects for the preparation of a lithium battery or accumulator comprising a stack of several, that is to say at least two, electrochemical cells (C).

Thus, it advantageously makes possible rapid assembling of the electrolyte gelled "under hot conditions" in the limited volume of the compartment, also known as "housing".

The return of the electrolyte under its liquid form makes possible homogeneous impregnation of the separator.

Finally, at a temperature of less than the temperature "T" and in particular at ambient temperature, the electrolyte regains its optimum characteristics of use in a bipolar Li-ion battery.

The method of assembling provided according to the invention thus makes it possible to have a perfect leaktightness, a self-sufficient mechanical strength related to the internal vacuum conditions of the element, and also perfect impregnation by virtue of the internal vacuum conditions of the element.

Other advantages and characteristics will become apparent on reading the description and figures which follow.

Diagram a) represents the behaviour of the diblock copolymers at a temperature of less than "T": the polymeric segments A (light) are unfurled and the polymeric segments B (dark) are in the folded back/wound into a ball form. In this configuration, the electrolyte is liquid, that is to say that the viscosity of the electrolyte is not modified.

Diagram b) represents the behaviour of the diblock copolymers at a temperature greater than "T": the polymeric segment A (light) and the polymeric segment B (dark) are in the unfurled form. In this configuration, the electrolyte is in the gelled form.

Figure 1:
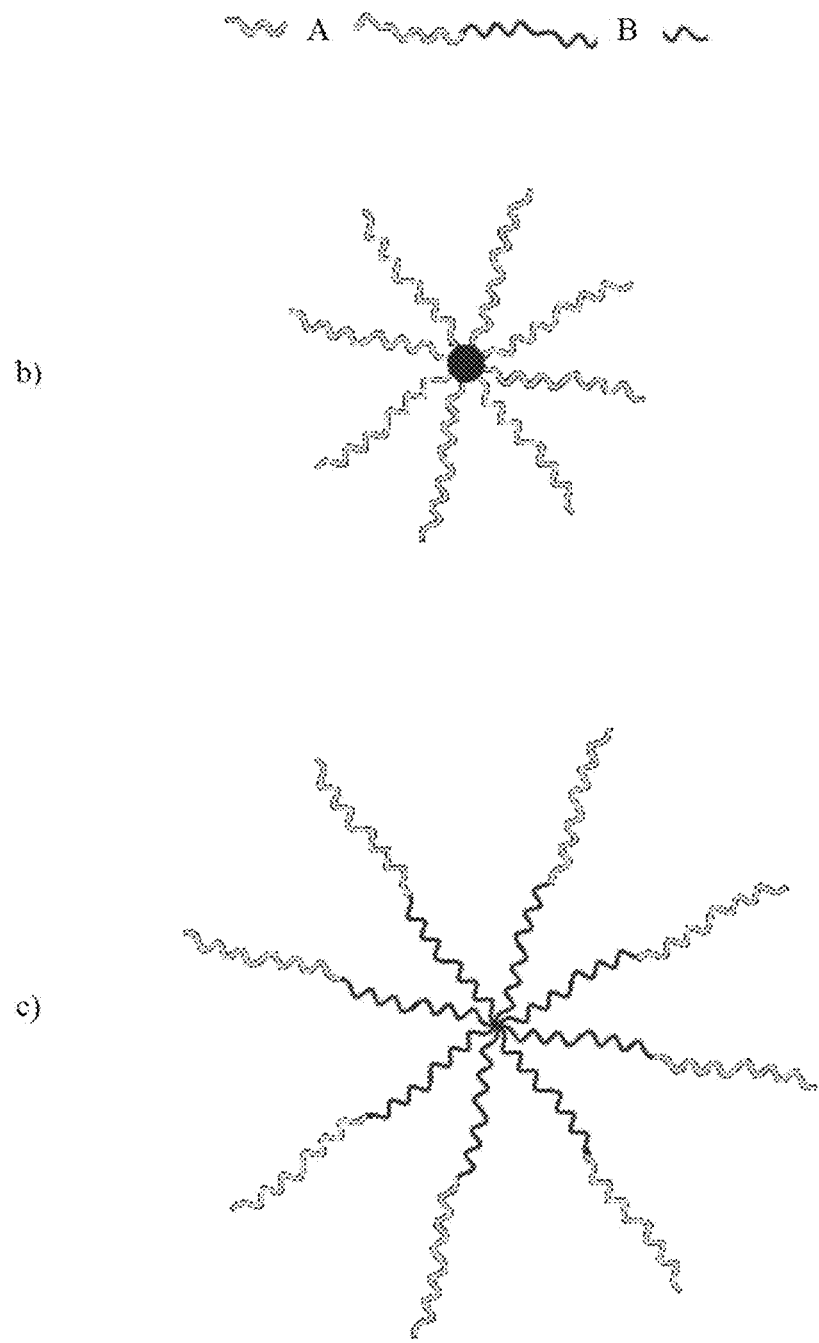
FIG. 1 exhibits a diblock copolymer, represented in a) is the base diblock consisting of the polymeric segment A (light) and the polymeric segment B (dark), represented in b) is the diblock at a temperature of less than "T": the polymeric segment A (light) is unfurled and the polymeric segment B (dark) is in the folded back/wound into a ball form, represented in c) is the diblock at a temperature greater than "T": the polymeric segment A (light) and the polymeric segment B (dark) are in the unfurled form.
Figure 2:
FIG. 2 exhibits a triblock copolymer, represented in a) is the base triblock consisting of the polymeric segment A (light), the polymeric segment B (dark) and the polymeric segment C (black), represented in b) is the triblock at a temperature of less than "T": the polymeric segment A is unfurled, while the polymeric segments B and C are in the folded back/wound into a ball form, represented in c) is the triblock at a temperature greater than "T": the polymeric segments A and B are in the unfurled form, whereas the polymeric segment C is in the folded back/wound into a ball form.
Figure 2:
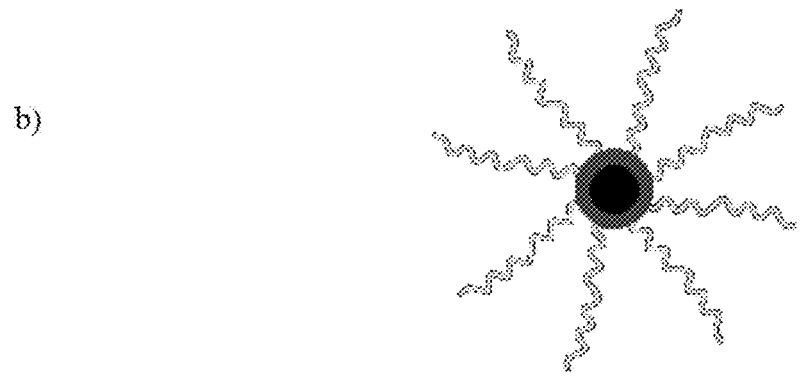
Figure 2:
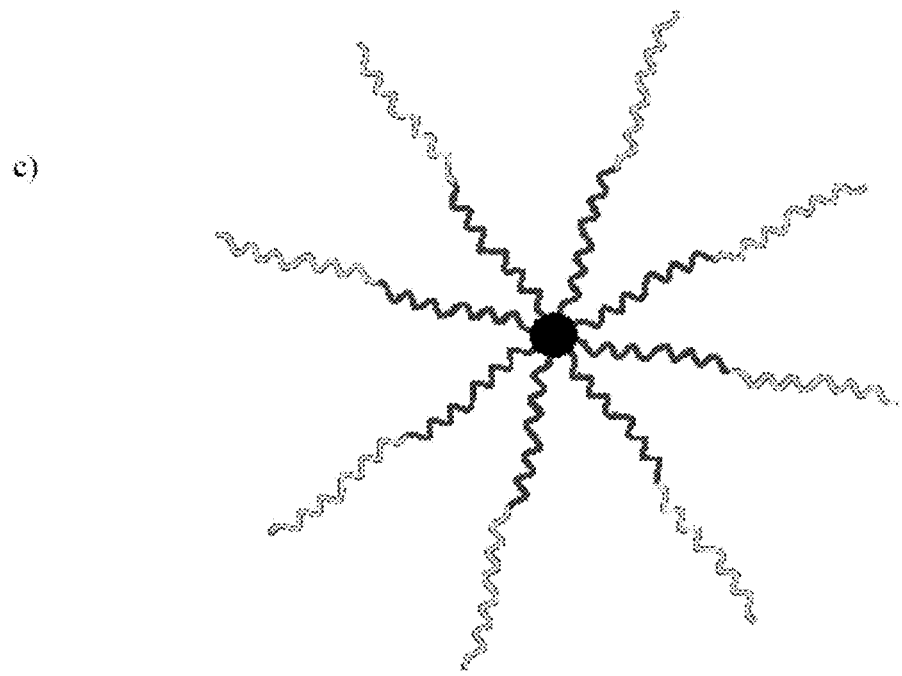
Figure 3:
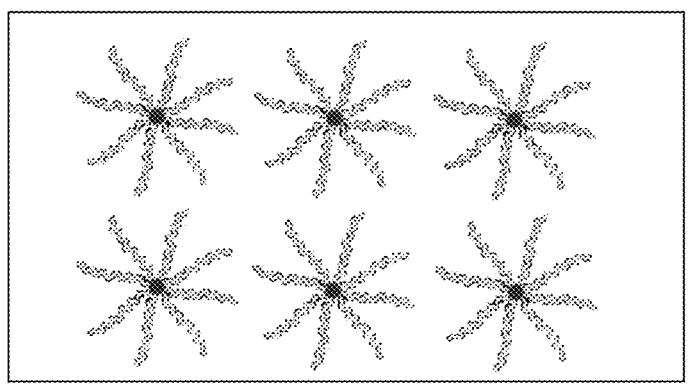
FIG. 3 represents the behaviour of the diblock copolymers as a function of the temperature.
Figure 3:
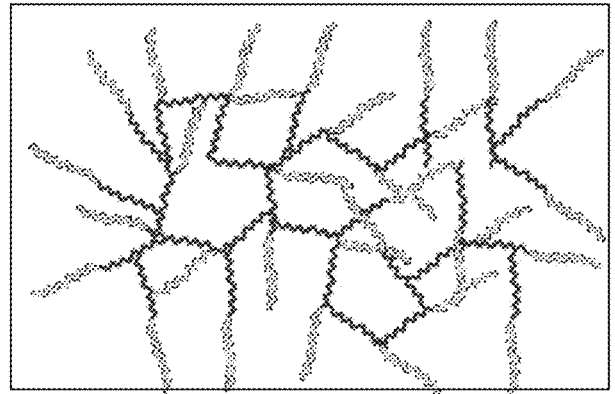
Figure 4:
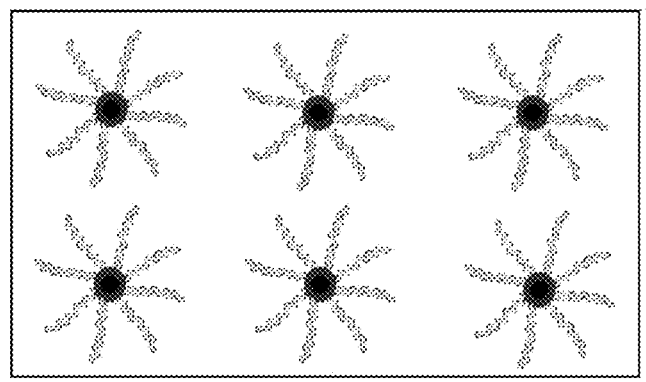
Figure 4:
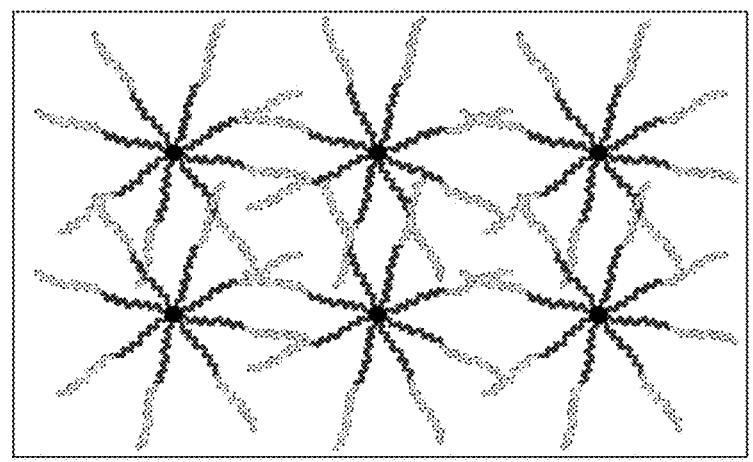

FIG. 4 represents the behaviour of the triblock copolymers as a function of the temperature.

Diagram a) represents the behaviour of the triblock copolymers at a temperature of less than "T": the polymeric segments A are unfurled, while the polymeric segments B and C are in the folded back/wound into a ball form. In this configuration, the electrolyte is liquid, that is to say that the viscosity of the electrolyte is not modified.

Diagram b) represents the behaviour of the triblock copolymers at a temperature greater than "T": the polymeric segments A and B are in the unfurled form, while the polymeric segments C are in the folded back/wound into a ball form. In this configuration, the electrolyte is in the gelled form.

Figure 5:
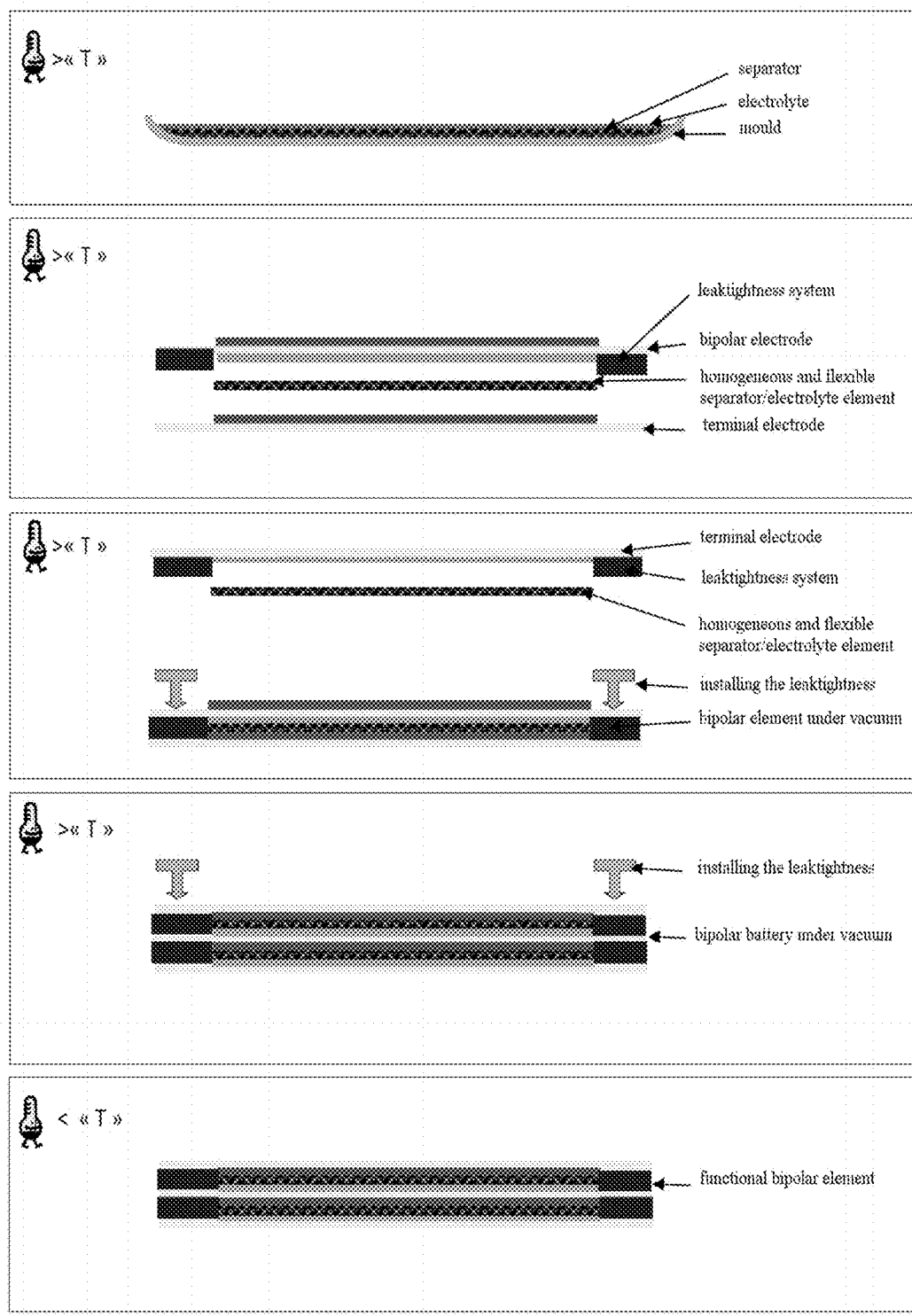

FIG. 5 represents a process for preparing bipolar elements for a battery having architecture "by stacking".

Figure 6:
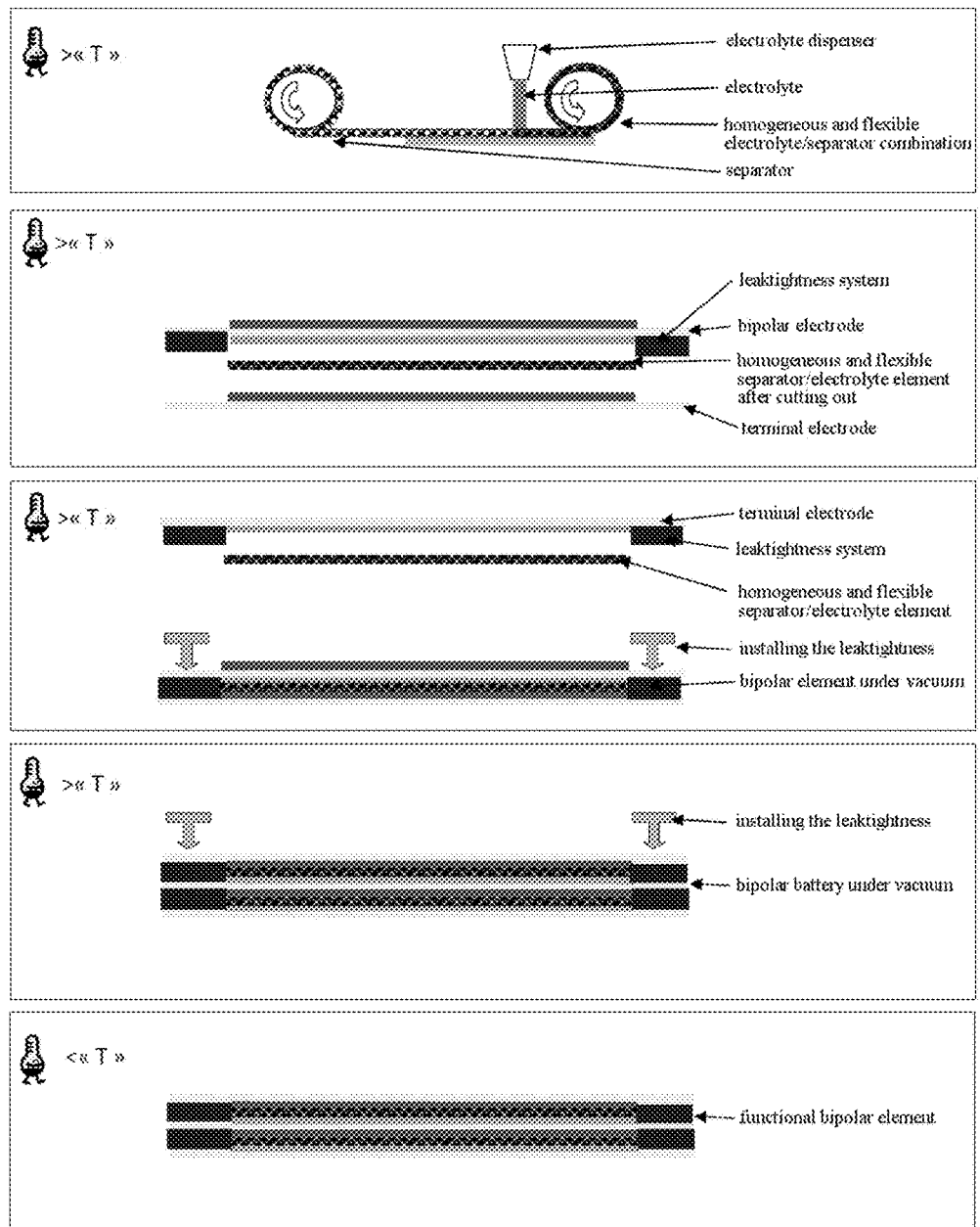

FIG. 6 represents a process for preparing bipolar elements for a battery having architecture "by winding".

DEFINITIONS

Polymer which is "soluble" in a solvent, within the meaning of the present invention, is understood to mean a polymer which, at a concentration of 0.1% by weight of active material in the said solvent at 25° C., results in a macroscopically homogeneous solution or suspension which is transparent or translucent, that is to say having a transmittance value at a wavelength of 500 nm through a sample with a thickness of 1 cm of at least 70%, preferably 80%.

Polymer which is "heat-sensitive", within the meaning of the present invention, is understood to mean a polymer, the properties of which, in particular with regard to the viscosity, will vary as a function of the temperature. The "heat-sensitive" nature of the polymers used according to the invention is essentially due to the presence of the polymeric segment (B) which has a dissolution temperature "T".

The temperature "T" denotes, in the context of the invention, the temperature of change of state of the electrolyte. Starting from this temperature, the electrolyte favours a gelled state and, below this temperature, it is liquid.

"Dissolution temperature", within the meaning of the present invention, is understood to mean a temperature above which the said polymer is soluble in the medium used, in particular in the electrolyte employed.

DETAILED DESCRIPTION

I—Heat-Sensitive Copolymer

As mentioned above, the block copolymer used in the present invention comprises at least one polymeric segment A which is soluble in the said electrolyte, at least one polymeric segment B having a temperature for dissolution "T" in the said electrolyte and, if appropriate, at least one polymeric segment C.

The polymeric segments (A), (B) and (C) are thus different in nature.

For obvious reasons, the nature and the length of each of the polymeric segments considered respectively for (A), (B) and (C) are chosen as a function of the properties desired and in particular as a function of the electrolyte chosen; in particular, the polymeric segments may be amphiphilic or of very similar nature.

Likewise, the block copolymer used according to the invention is advantageously electroinactive. It thus has substantially no effects on the performance of the battery under the normal conditions of use and in particular when the temperature of the battery is less than "T", in particular at ambient temperature.

Polymeric Segment A

The polymeric segment A advantageously makes possible the steric stabilization of the electrolyte and thus makes it possible to avoid the risks of sedimentation.

As mentioned above, the polymeric segment A is soluble in the said electrolyte, whatever the temperature; in particular, it is soluble at a temperature of less than "T".

Advantageously, the polymeric segment A has a molar mass ranging from 2000 g·mol$^{-1}$ to 300 000 g·mol$^{-1}$, preferably from 8000 g·mol$^{-1}$ to 80 000 g·mol$^{-1}$.

Preferably, the polymeric segment A exhibits a degree of polymerization $DP_A$ of greater than 10, preferably of greater than 20 and more particularly ranging from 50 to 800.

Any polymer soluble in the electrolyte employed may be used as polymeric segment A.

According to a preferred form, the polymeric segment A is chosen from the following polymers: polyacrylates, polymethacrylates, polycarbonates, polyester carbonates, polylactones, polylactams, polyesters, polyethers, soluble homopolymers and random copolymers of polyethers, in particular of polyoxyethylene, polyoxypropylene or polyoxybutylene, and also the copolymers of these polymers or corresponding monomers.

The polymeric segment A may thus be composed of monomers of the same nature or of monomers of different natures.

According to a particularly preferred form, the polymeric segment A is represented by a polymer chosen from polycarbonates, polyethers and their copolymers.

Polymeric Segment B

The block copolymer used in the present invention additionally comprises at least one polymeric segment B having a temperature for dissolution "T" in the said electrolyte.

Preferably, the polymeric segment B has a molar mass ranging from 2000 g·mol$^{-1}$ to 300 000 g·mol$^{-1}$, preferably from 8000 g·mol$^{-1}$ to 80 000 g·mol$^{-1}$.

Preferably, the polymeric segment B exhibits a degree of polymerization $DP_B$ of greater than 10, preferably of greater than 20 and more particularly ranging from 50 to 800.

According to a preferred form, the polymeric segment B is a polymer obtained from at least one monomer chosen from the following monomers: acrylic and methacrylic acids, N-alkylacrylamides or N-alkylmethacrylamides, in particular N-isopropylacrylamide, N-isopropylmethacrylamide or N,N-diethylacrylamide, saccharides, vinylidene fluoride or hexafluoropropylene.

According to a particularly preferred form, the polymeric segment B is a polymer chosen from poly(N-alkylacrylamides), poly(N-alkylmethacrylamides), polysaccharides, polyvinylidene fluoride (PVDF) and poly(vinylidene fluoride-hexafluoropropylene) copolymers (PVDF-HFP).

Advantageously, the polymeric segments B/polymeric segments A molar ratio is greater than 0.5 and preferably ranges from 1 to 10 and more preferably from 2 to 5.

Polymeric Segment C

Advantageously, the block copolymer additionally comprises at least one polymeric segment C which is insoluble in the electrolyte. More specifically, the polymeric segment C is insoluble in the electrolyte whatever the temperature; in particular, it is insoluble at a temperature of greater than "T".

Without wishing to be committed to any one theory, the polymeric segment C contributes to the creation of cross-linking nodes which will stabilize the network formed by the block copolymers and thus improve the structure of the gel. The polymeric segment C thus makes it possible to increase the elastic modulus of the gel.

In addition, the presence of polymeric segments C in the block copolymer makes it possible to use the said block copolymer in the electrolyte in a reduced amount without the stability of the electrolyte in the gelled form being detrimentally affected.

Preferably, the polymeric segment C is chosen from saturated or unsaturated and branched or unbranched polyolefins, in particular poly($C_2$-$C_{12}$ olefins), polystyrene and their mixtures and their copolymers.

Advantageously, the polymeric segments A/polymeric segments C molar ratio ranges from 0.5 to 10 and preferably from 1 to 5.

Advantageously, the polymeric segments B/polymeric segments C molar ratio ranges from 1 to 10 and preferably from 1 to 3.

The block copolymers according to the invention may be obtained by radical, anionic or cationic controlled polymerization (ATRP (Atom Transfer Radical Polymerization), ITRP (Iodine Transfer Radical Polymerization), RAFT (Reversible Addition-Fragmentation Chain Transfer), and the like). This is because these types of polymerization make it possible to obtain a specific geometry of the block copolymer, depending on the properties targeted. This is because it is possible to envisage choosing the polymeric segments in order to obtain a modification to the properties of the said block copolymer as a result of a modification to pKa or pKb.

The block copolymer used according to the invention may thus be an alternating, random or comb block copolymer.

The appended FIGS. 1-4 exhibit several alternative forms of the block copolymers suitable for the invention.

II—Electrolyte

According to a preferred form, the block copolymer(s) is/are present in an amount ranging from 1 to 25% by weight and preferably from 10 to 20% by weight, with respect to the total weight of the electrolyte.

The electrolyte used according to the invention comprises at least one lithium salt. The lithium salts may be chosen from any lithium compound capable of being dissociated in an organic solvent to produce lithium ions. Mention may be made, as examples of these lithium compounds, of $LiClO_4$, $LiBF_4$, $LiPF_6$, $LiCF_3SO_3$ or $LiN(CF_3SO_2)_2$.

The electrolyte used according to the invention may comprise any organic solvent generally used in the manufacture of a lithium electrochemical accumulator; in particular, the solvent is chosen from ethylene carbonate, propylene carbonate, dimethyl carbonate, ethyl methyl carbonate, diethyl carbonate, tetrahydrofuran, tetraethylene glycol dimethyl ether, dimethyl ether, dioxolane, dioxane, polyethylene glycol dimethyl ether and/or nitriles or their mixture(s).

Thus, the ionic conduction is provided by the electrolyte containing a solvent, or a mixture of solvents, and comprising the copolymer and lithium salts.

As emerges from the above, the polymeric segment (B) is chosen so as to adjust the temperature "T", which conditions the change in viscosity, to a value above which the electrolyte can be easily handled, in particular is viscous enough not to flow during the filling of the cell, without exhibiting risks for the operator, in particular of burns or of toxic emanations.

Advantageously, the said electrolyte is handled, during the preparation of the said battery or accumulator, at a temperature greater than the temperature "T", advantageously ranging from "T" to "T"+20° C.

Advantageously, the temperature "T" is less than or equal to 80° C.; preferably, "T" ranges from 40° C. to 80° C., preferably from 60° C. to 80° C. and more preferably from 70° C. to 80° C.

Preferably, the electrolyte in the gelled form exhibits a shear storage modulus G' of greater than 500 Pa and a shear loss modulus G'' of less than G'.

In addition, the electrolyte exhibits a conductivity C1 varying from $10^{-4}$ S·cm$^{-1}$ to 0.1 S·cm$^{-1}$ at a temperature of less than "T", that is to say when it is in the liquid form.

III—Process

The invention is also targeted at a process for preparing a lithium battery or accumulator comprising at least:

one electrochemical cell (C) composed of at least one anode and one cathode, the anode and the cathode forming part of a bipolar electrode, which are located on either side of a separator impregnated with an electrolyte, and one compartment constructed in order to contain the electrochemical cell(s) with leaktightness and traversed by a portion of the current collectors forming the poles.

More particularly, the electrolyte considered according to the invention, that is to say containing at least one heat-sensitive copolymer, is handled in the form of a gelled layer, which is deposited at the surface of the said anode or cathode.

Advantageously, the gelled electrolyte layer already incorporates the separator in order to form the "separator/electrolyte" combination.

Preparation of the "Separator/Electrolyte" Combination

Two embodiments may be envisaged for the preparation of this combination according to the architecture considered for the battery, namely by "stacking" or by "winding".

According to a first alternative form, favoured in the case of an architecture by "stacking", the process comprises a stage which consists in carrying out, at a temperature greater than the temperature "T", advantageously ranging from "T" to "T"+20° C., the deposition of the said gelled electrolyte over at least one surface of a separator in an amount sufficient to form a supported layer. Advantageously, this stage of deposition of the gelled electrolyte layer is carried out in a mould in which at least one separator, generally in the form of a sheet or of a strip, has been deposited beforehand.

According to a second alternative form, favoured in the case of an architecture by "winding", the process according to the invention comprises a stage which consists in depositing, by coating or spraying over the separator considered, the gelled electrolyte. This deposition is carried out at a temperature greater than "T", advantageously ranging from "T" to "T"+20° C. The separator is generally in the form of a strip or of a sheet.

In a more detailed manner, the process for preparing an electrochemical cell according to the invention comprises at least the stages consisting in:

(a) preparing a unitary element by assembling a positive electrode (cathode), the "separator/electrolyte" combination and a negative electrode (anode), (b) placing the unitary element under air vacuum, (c) rendering the unitary element leaktight by producing an air vacuum in a housing, and (d) reinstating the unitary element under atmospheric pressure and ambient temperature. At ambient temperature, that is to say at a temperature of less than "T", the electrolyte is in the liquid form; consequently, this stage makes it possible to carry out the impregnation of the separator and also to place the unitary element under mechanical stress.

Generally, the cathode considered in stage (a) represents the positive part of a current collector, known as current collector 1, and the anode used is more precisely the negative part of a current collector adjacent to the current collector 1.

Advantageously, stage (b) is carried out in a packaging of housing type with a volume suited to the size of the final stack corresponding to the combination of the unitary elements. The use of a housing of suitable volume makes it possible to produce the stack while minimizing the empty space between the stack and the housing.

In stage (c), it may be noted that the filling is always carried out before the complete leaktightness of the element. Several forms of leaktightness are compatible with the fact of operating under vacuum, in particular mechanical leaktightness, heat sealing, thermal bonding, ultrasonic welding, UV curing, and the like. The volume of the housing, suited to the size of the stack, in addition makes it possible to minimize the stresses related to the pressure between the inside and the outside of the unitary element; the leaktightness can be achieved, for example, by compression under cold conditions, under hot conditions or under UV radiation.

A battery comprising "n" stacks is prepared by repeating the abovementioned stages "n" times, "n" ranging from 2 to 200.

During the preparation of the unitary elements 2 to "n−1", two bipolar electrodes are used.

During the preparation of the unitary elements 1 and "n", a terminal electrode and a bipolar electrode are used.

The exemplary embodiments 1 and 2 which appear below exhibit processes for the preparation of a battery comprising an electrolyte in accordance with the invention, that is to say gelled "under hot conditions", more precisely gelled at a temperature greater than "T". The battery is rendered leaktight therein via the use of a vacuum housing of reduced volume.

The examples which follow illustrate the invention without limiting the scope thereof.

Example 1

Preparation of a Bipolar Cell by Stacking with an Electrolyte in Accordance with the Invention This process is illustrated in FIG. 5, in which stages 1 to 5 are successively presented from the top downwards.

Stage 1—Gelling of the electrolyte and of its additive (copolymer) in a suitable mould, at a temperature greater than "T", particularly ranging from 40° C. to 80° C. The amount of electrolyte is suitable for the requirements of the battery element. The presence of the separator in the mould makes it possible to obtain a "separator/electrolyte" combination in the solid form.

Stage 2—Employing an electrode/"separator/electrolyte" combination/electrode "stacked" unitary stack combination, under a temperature greater than "T", in order to obtain a bipolar element.

Stage 3—Installing a system for leaktightness of the bipolar element under vacuum in order to avoid the presence of air in the system under high temperature.

Stage 4—Repeating the stage of assembling and of leaktightness (stages 2 and 3) in order to manufacture the number of compartments such as necessary for the production of the desired battery under high temperature.

Stage 5—Bringing the leaktight combination back to ambient temperature in order to make it possible for the electrolyte to regain its optimum properties and to obtain a functional bipolar battery.

Example 2

Preparation of a Windable Bipolar Cell Using an Electrolyte in Accordance with the Invention This process is illustrated in FIG. 6, in which stages 1 to 5 are successively presented from the top downwards.

Stage 1—Shaping an electrolyte/separator combination using the viscous characteristics of the electrolyte and of its additive (copolymer) at a temperature greater than "T", in particular ranging from 40° C. to 80° C., so as to obtain a flexible "separator/electrolyte" sheet which can be wound. On conclusion of this stage, a "wound" separator/electrolyte combination is obtained.

Stage 2—Employing an electrode/"separator/electrolyte" combination/electrode combination under high temperature. The manufacturing method used is a system for lamination and distribution of the elements of "roll-to-roll" type in order to make possible facilitated preparation of the unitary elements.

Stage 3—Installing a system for leaktightness of the bipolar element under vacuum in order to avoid the presence of air in the system under high temperature.

Stage 4—Repeating the stage of assembling and of leaktightness (stages 2 and 3) in order to manufacture the number of compartments such as necessary for the production of the desired battery under high temperature.

Stage 5—Bringing the leaktight combination back to ambient temperature in order to make it possible for the electrolyte to regain its optimum properties and to obtain a functional bipolar battery.

The preparation processes of Examples 1 and 2 were carried out with a copolymer formed of the following polymeric segments A, B and C:

Segment A: polyacrylate (10 000 g·mol$^{-1}$)

Segment B: poly((n-butyl)methacrylamide) (50 000 g·mol$^{-1}$)

Segment C: polyethylene (15 000 g·mol$^{-1}$).

The mixture: EC/PC/DMC $(1/1/3)_{mol}$+1M LiTFSI (LiN$(CF_3SO_2)_2$) is used as electrolyte.

The temperature "T" for dissolution of the polymeric segment B corresponding to the gelling of the electrolyte is equal to 80° C.

The invention claimed is:

1. Method for preparing a bipolar lithium-ion battery or accumulator, the method comprising: using an electrolyte having a reversible liquid/solid phase change wherein said electrolyte contains at least one block copolymer comprising at least one polymeric segment A which is soluble in the said electrolyte and at least one polymeric segment B having a temperature for dissolution "T" in the said electrolyte, the polymeric segments A and B being present in amounts sufficient to make possible the physical gelling of the electrolyte at a temperature greater than or equal to the temperature "T", said electrolyte being handled, during the preparation of the said battery or of the said accumulator, in the gelled form, at a temperature greater than the temperature "T".

2. Method according to claim 1 wherein the temperature "T" varies from 40° C. to 80° C.

3. Method according to claim 1 wherein the electrolyte in the gelled form exhibits a shear storage modulus G' of greater than 500 Pa and a shear loss modulus G" of less than G'.

4. Method according to claim 1 wherein the electrolyte exhibits a conductivity C1 varying from $10^{-4}$ S·cm$^{-1}$ to 0.1 S·cm$^{-1}$ at a temperature of less than "T".

5. Method according to claim 1 wherein the block copolymer comprises at least one polymeric segment A chosen from the following polymers: polyacrylates, polymethacrylates, polycarbonates, polyester carbonates, polylactones, polylactams, polyesters, polyethers, soluble homopolymers and random copolymers of polyethers.

6. Method according to claim 1 wherein the block copolymer comprises at least one polymeric segment B obtained from at least one monomer chosen from the following monomers: acrylic and methacrylic acids, N-alkylacrylamides or alkylmethacrylamides, saccharides, vinylidene fluoride or hexafluoropropylene.

7. Method according to claim 1 wherein the block copolymer comprises at least one polymeric segment C which is insoluble in the electrolyte.

8. Method according to claim 7, in which the block copolymer comprises at least one polymeric segment C chosen from saturated or unsaturated and branched or unbranched polyolefins, polystyrene and their mixtures and their copolymers.

9. Method according to claim 1, in which the block copolymer(s) is/are present in an amount ranging from 1 to 25% by weight, with respect to the total weight of the electrolyte.

10. Method for preparing a lithium battery or accumulator comprising at least one electrochemical cell (C), composed of at least one anode and one cathode on either side of a separator impregnated with an electrolyte, and one compartment constructed in order to contain the electrochemical cell(s) with leaktightness while being traversed by a portion of the current collectors forming the poles, wherein:

the said electrolyte is one having a reversible liquid/solid phase change and contains at least one block copolymer comprising at least one polymeric segment A which is dissolved in the said electrolyte and at least one polymeric segment B having a transition temperature for dissolution "T" in the said electrolyte, the polymeric segments A and B being present in amounts sufficient to make possible the physical gelling of the electrolyte at a temperature greater than or equal to the temperature "T", and the said process comprises at least the stages consisting in:
handling the said electrolyte during the production of the said cell in the gelled form temperature greater than or equal to the temperature "T" and
lowering the temperature of the said electrolyte, after the leaktightness of the said cell containing the said gelled electrolyte has been obtained, to a temperature less than the temperature T at which the said electrolyte is in the liquid form.

11. Method according to claim 10, wherein the said electrolyte is employed in the form of a gelled layer which is deposited at the surface of the said anode or cathode.

12. Method according to claim 11 wherein the gelled layer of the said electrolyte already incorporates the said separator.

13. Method according to claim 12 wherein the gelled electrolyte/separator combination is obtained by coating/spraying the said gelled electrolyte over the separator.

14. Method according to claim 10, comprising a stack of several electrochemical cells (C).

* * * * *